Oct. 8, 1957 S. WILMAN 2,808,896
EXHAUST MUFFLERS FOR INTERNAL COMBUSTION ENGINES
Filed Feb. 1, 1954 3 Sheets-Sheet 2

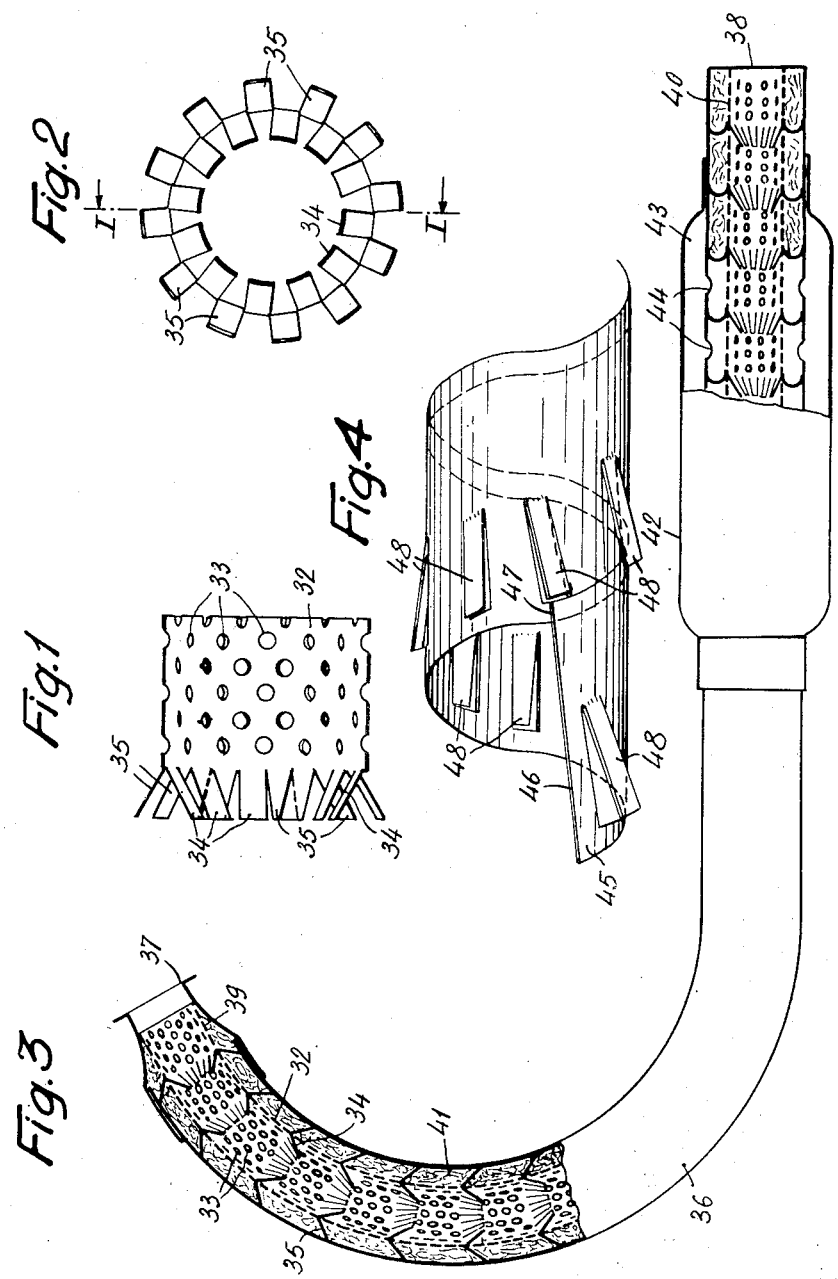

INVENTOR
SIGISMOND WILMAN
BY Linton and Linton
ATTORNEYS

Oct. 8, 1957   S. WILMAN   2,808,896
EXHAUST MUFFLERS FOR INTERNAL COMBUSTION ENGINES
Filed Feb. 1, 1954   3 Sheets-Sheet 3
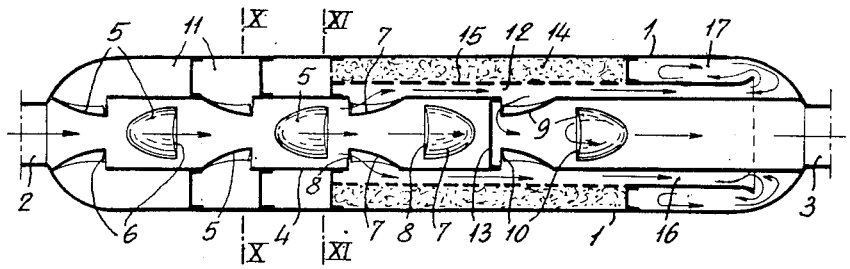
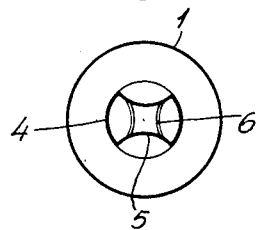 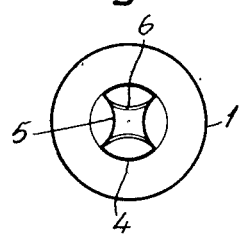
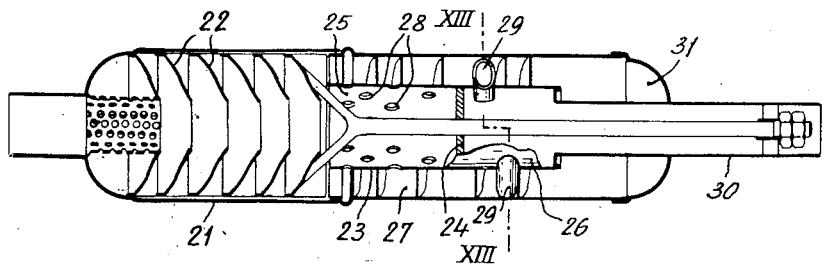
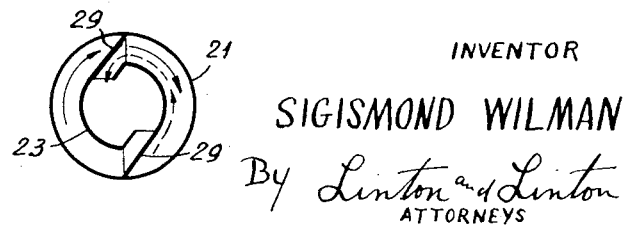
INVENTOR
SIGISMOND WILMAN
By Linton and Linton
ATTORNEYS

United States Patent Office

2,808,896
Patented Oct. 8, 1957

2,808,896

EXHAUST MUFFLERS FOR INTERNAL COMBUSTION ENGINES

Sigismond Wilman, Courbevoie, France

Application February 1, 1954, Serial No. 407,508

Claims priority, application France February 2, 1953

1 Claim. (Cl. 181—50)

This invention relates to exhaust mufflers for internal combustion engines.

It is known that before the exhaust valve or port of an internal combustion engine opens, a pressure develops in the corresponding cylinder which has a value sufficient to impart a supersonic velocity to the exhaust gases.

The momentum developed by this extremely high velocity expels the gases from the cylinder and creates therein a vacuum which is as high as the exhaust was short and fierce, which is particularly noticeable in two-stroke engines.

Then the pressure wave, reflected in the exhaust muffler or the surrounding atmosphere, is returned to the cylinder, so as to fill up the said vacuum and replace it by a back pressure wave of a frequency increasing in proportion with the preceding vacuum.

Briefly, a vibratory gas motion is set up in the exhaust conduit.

At a given engine speed the exhaust-port opening time corresponds to one-half period of the stationary wave in the conduit and, in this case, it will be observed that the highest vacuum is reached when the exhaust port starts closing. This results in an improved cylinder-filling and in a higher power output, but when the engine operates at half this speed the exhaust-port opening time will correspond to a full period of the stationary wave; in other words, the end of the exhaust port open time will be coincident with the return of the reflected pressure wave, thereby impeding the filling of the cylinder with fresh mixture and causing a loss of engine power which may even amount to 30% in the case of two-stroke engines. In this case it is said that the muffler retards the engine, which is untrue, for the same muffler fitted at the end of a longer or shorter pipe will not exert any braking action on the engine. On the other hand, the same phenomenon is observed under free exhaust conditions when the engine power varies with the length of the exhaust pipe. Again, it may be stated that under certain conditions it is preferable to retard the gas exhaust in the muffler because limiting the vacuum in the cylinder limits in the same proportion the amplitude of the pressure wave taking place in the next half-period, so that the power curve will have a more regular trend.

Now it is the object of the present invention to take advantage of the vacuum created in the cylinder, as this vacuum always develops at the end of the exhaust period at a given engine speed (in other words, when the duration of the exhaust open time is approximately equal to one half-period of the stationary wave of the fundamental sound, or one of its odd harmonics), and to prevent the pressure wave from returning to the cylinder after being reflected by the exhaust muffler before the exhaust port closes (when the exhaust open time, at another engine speed, approximates the complete period of the stationary wave of the fundamental sound or one of its odd harmonics). The device for counteracting the back pressure wave may be constituted in various manners, by either providing suitably disposed mechanical valves closing automatically as the exhaust gases tend to flow back to the cylinder, or preferably by using simple means such as the arrangement, in the gas path, of a set of funnels, tongues, baffle means or inclined walls designed to promote the gaseous flow or venting it to the atmosphere while rendering it more difficult toward the engine. In other words, the arrangement intended to prevent the back pressure from reaching the engine may consist of a known or novel device mounted in the first portion of the muffler.

To this end, the present invention provides an exhaust muffler divided into two portions through which the exhaust gases are caused to flow in succession; the first portion is adjacent to the engine and permits a free flow of exhaust gases; the essential part played by this first portion is to prevent the reflected wave from reaching the engine backwards, and its auxiliary purpose is to absorb sound waves, especially those in the upper frequency ranges; the other portion is intended chiefly for damping or cancelling through any known or novel devices the sounds not absorbed by the first portion of the muffler.

In the forms of embodiment comprising tongued or slatted orifices, the tongues, slats, or louvres may be cut or stamped either in a conduit consisting of a single, long pipe, or in a conduit made of a plurality of successive sections in the form of metal rings interfitting one another, or in a metal strip wound in helical fashion so as to form a flexible pipe; high frequency waves may be absorbed or cancelled by arranging between the inner conduit and the outer envelope or case a sound-absorbing material such as glass wool or braid, metal or asbestos wool or chips, etc.

On the other hand, the frequencies in the medium and low ranges may be absorbed either by acoustical resonance chambers disposed externally of the exhaust conduit, or by known or novel dephasing or acoustical interference devices.

Other features of this invention will become apparent as the following description proceeds with reference to the accompanying drawings forming part of this specification and given by way of example only. In the drawings:

Figure 1 is an axial section taken upon the line I—I of Figure 2, showing a central conduit section according to a first form of embodiment;

Figure 2 is an end view of the same section;

Figure 3 is an elevational view with portions in axial section, showing a complete exhaust muffler of which the various sections are interfitted into one another and associated with a resonance chamber;

Figure 4 is a perspective view showing one section of the inner or central tube of the exhaust conduit according to another form of embodiment;

Figure 5 is a sectional view showing a sheet metal element in which slatted orifices are formed by stamping or the like;

Figure 9 is an axial section showing another embodiment of the muffler according to this invention, which comprises a rectilinear sound-insulated resonance conduit;

Figures 10 and 11 are cross-sections taken substantially upon the lines X—X and XI—XI of Figure 9;

Figure 12 is an axial section showing a muffler according to this invention, which comprises a helical gas passage formed with an extension communicating with the resonance chamber, and Figure 13 is a cross-section taken substantially upon the line XIII—XIII of Figure 12.

Figure 5:
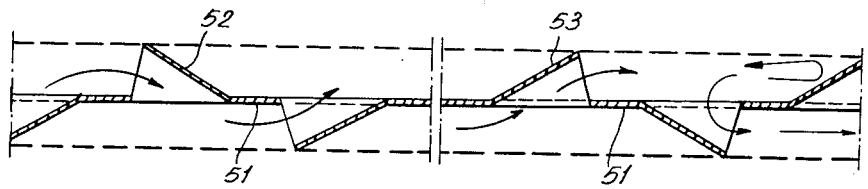

The muffler element shown in Figures 1 and 2 consists of a metal tube section 32 having perforations 33 formed therein and a non-perforated end portion cut or stamped to form a circular set of sloping tongues or slats cut along lines merging with generatrices of the tube section. These tongues or slats are inclined through a certain angle at their bases, i. e. at their attaching ends, the folding being effected alternately inwardly and outwardly; thus, the drawing shows inwardly inclined tongues 34 and outwardly inclined tongues 35; as a consequence, the set 34 will constitute approximately a discontinuous frusto-conical body having its larger end attached to the cylindrical body of the tube section 32, and the set 35 will constitute approximate a discontinuous frusto-conical body having its smaller end attached to this cylindrical body, as clearly shown in the drawing.

The uncut, substantially cylindrical end of another, completely identical section may fit in between these two frusto-conical portions 34, 35. Therefore, a series of interconnected sections of the type shown in Figures 1 and 2 may be disposed inside the exhaust conduit 36 of Figure 3; the inlet end of this conduit is indicated at 37 and its outlet end at 38; this conduit is completed by a pair of end sections 39, 40 secured in any suitable manner to the main tube 36.

The interval between the sections 32 and conduit 36 will advantageously be filled with a noise-attenuating material 41 (such as glass or steel wool).

The conduit portion adjacent to the exit end may be located inside an exhaust box 42 forming around the conduit 36 an annular resonance chamber 43; in this case, holes 44 are formed in the wall of conduit 36 throughout the length of box 42 to enable the latter to communicate with the inner peripheral space of the conduit which, along the box-length, is not filled with sound-absorbing material.

It will be noted that the annular sections 32 are positioned in the first portion of the conduit so that the tongues 34, 35 tend to counteract the back flow of the exhaust gases to the engine, whilst in the second portion of the conduit the annular sections 32 are so positioned as to retard the flow of gas to the atmosphere.

Figure 4 shows in perspective view a central tube adapted to be substituted for the series of interfitting annular sections 32 and made of a metal strip 45 wound helically, the figure showing only the extreme portion 46 of the tubular structure. Each turn of the helix overlaps the preceding turn through a small portion of its width, as shown at 47. In the subsequent turns are cut or stamped small tongues 48 which in this embodiment are shown as being bent outwardly, but it will be readily understood that these tongues may be folded either inwardly or alternately inwardly and outwardly. In all cases the direction in which the tongues are bent will be selected with a view to provide a retarding effect on the gas flowing in a given direction of the flexible conduit thus constituted. The subsequent turns may be fixed to one another through any suitable known or novel means. It is advantageous to manufacture a flexible central tube of this type by securing the turns to one another along one generatrix of the resulting cylinder, by spot welding, or by using clamps, punch marks or any other means.

The sheet metal element 51 shown in Figure 5 is formed with tongues, louvres or slats 52 stamped alternately on one and the other side of the plate. At the inlet end of the muffler, assumed to be on the left-hand side of the figure, the tongues 52 are inclined outwardly, so that they tend to collect the gases flowing from left to right, thereby compelling them to flow from one to the other side of the plate. At the outlet end, on the contrary, the tongues 53 are inclined in the opposed direction so that the gases flowing from left to right and impinging on their surfaces will be deflected away from the plate, instead of facilitating their passage across the holes in this plate for continuing their sinusoidal path. Thus, the flow of gases toward the outlet end is retarded by the tongues or louvres 53 of this second section of the device.

Figure 6:
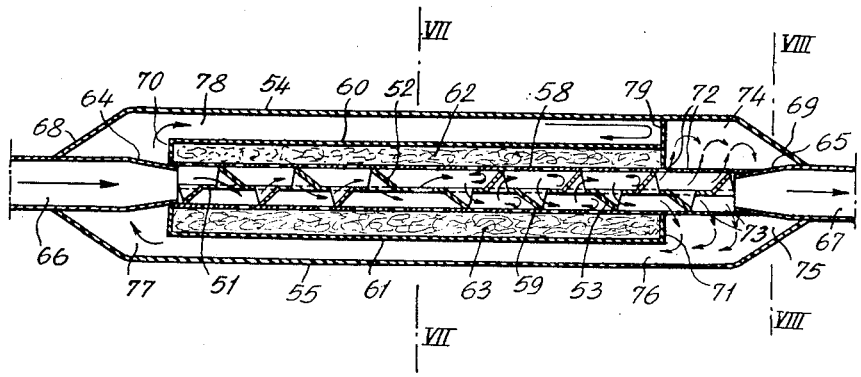
Figure 6 is a longitudinal section showing a muffler having a relatively flat-sectioned gas passage.
Figure 7:
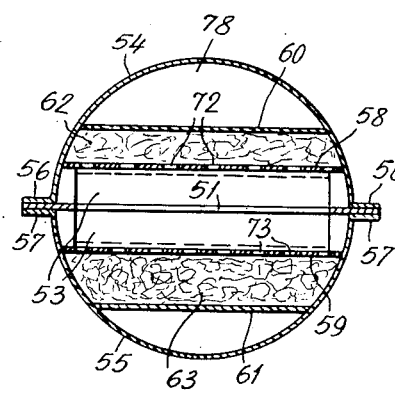
Figures 7 and 8 are cross-sections taken substantially upon the line VII—VII and VIII—VIII of Figure 6, respectively.
Figure 8:
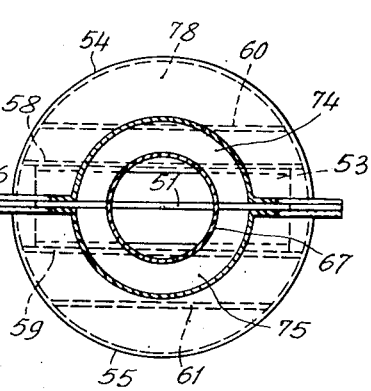

The muffler illustrated in Figures 6 and 7 is provided with the plate shown in Figure 5 and its outer case consists of a pair of shell-like members 54, 55 formed with lateral flanges 56, 57; the side edges of the central plate 51 are positioned between these flanges and the assembly welded together through any suitable process.

The gas circulation takes place in a relatively flat passage formed between the two perforated walls 58, 59 disposed longitudinally on either side of the intermediate diametral plate 51.

The packing or sound-absorbing material is contained in compartments 62, 63 provided on either side of the perforated walls 58, 59 and these compartments are bound in the case or box by longitudinal walls 60, 61, and transverse walls 70, 71.

An inlet pipe 66 connected to the engine exhaust and an outlet pipe 67 communicating with the atmosphere extend somewhat within the ends of the above-described muffler body. These cylindrical pipes merge through the flattened tube sections 64, 65 with the substantially flat conduit formed between the walls 58—59.

The drawings show that the exhaust gases are imparted a substantially sinusoidal motion by the tongues or louvres 52 by alternately projecting these gases against the sound-isolating upper and lower flat walls of the arrangement.

In the second portion of the muffler the tongues or louvres 53 are directed in the opposed direction in order to retain one portion of the exhaust gases in small recesses and to compel them to flow through the sound-absorbing material. However, the last two tongues do not reject the gases against the absorbing material but compel them to penetrate through holes 72, 73 into chambers 74, 75 communicating with each other through the interval formed on either side of the relatively flat tube 65. Chamber 75 communicates with the resonance conduit 76 constituted on the one hand by the flat wall 61 and on the other hand by the lower plate 55 of the cylindrical case or box of the muffler. The resonance conduit 76 terminates in the resonance chamber proper 77 divided into two compartments, a lower and an upper compartment, the latter having an extension forming a passage 78 for increasing the volume of the aforesaid resonance chamber.

The operation of the muffler will be readily understood from the above description and the explanations given herein.

The arrows indicate the general path of the exhaust-gas flow from the engine to the atmosphere through the substantially flat conduit, that is to say, in the left-to-right direction in Figure 6. In the first portion of the flat conduit extending from the left side of Figure 6 to the section line VII—VII, the gases follow a substantially sinusoidal path passing alternately on one and the other side of plate 51, this passage across the plate being facilitated by the deflecting surfaces 52 bent with a view to directing the gas flow to the opposed side of the plate across the relevant hole. In this same portion the surfaces 52 counteract any tendency of the reflected wave to flow back to the engine, since the gases flowing in the opposed direction, i. e. from right to left, will impinge against the surfaces 52 and be deflected toward the absorption compartments 62—63.

In the other portion of the muffler the exhaust gases are also directed toward the outlet along a sinusoidal path, but the deflecting surfaces 53, instead of promoting their passage across the plate 51, tend to deviate the gas flow toward the aforesaid compartments 62, 63, thus developing a retarding action and damping out any residual noise.

Adjacent to the outlet end of the muffler the substantially flat conduit communicates with chambers 74, 75 communicating in turn with the resonance chamber 77, 78 across the resonance passage 76. Obviously, the dimensions of this resonance device are calculated to match the pulsating frequency of the engine; in other words, the time required for the sound wave to travel through chamber 75, passage 76, chambers 77 and 78, be reflected by wall 79 and travel back through the same path to chamber 75, should be equal to one-half of the pulsating period at the engine velocity, according to the frequency to be cancelled.

The features characterizing the present invention are also applicable to inlet mufflers: in this case all the baffle surfaces or louvres will face a single direction, that is, the direction promoting the gas flow toward the engine and preventing the reflected wave from being returned to the atmosphere.

It will be noted that the manufacture of the muffler according to this invention is particularly simple since all the deflecting surfaces or louvres can be cut or stamped in a single sheet metal part 51 which is subsequently mounted in the device between the pair of shell-like parts of the case or box without requiring any special fixation. The walls 58, 59, 60, 61, 70 and 71 may also be mounted through very simple means in the pair of shell-like parts 54, 55.

The muffler shown in Figures 9 to 11 comprises an outer case 1 containing between the inlet 2 and the outlet 3 a central tube 4 formed with perforations 6, 8, 10 providing as many louvres 5, 7, 9 extending inwardly of tube 4 and throttling the cross-sectional area thereof at the corresponding places. In the first portion of the muffler these orifices 6 connect the central tube 4 with a plurality of acoustical resonance chambers 11 of different capacities, and the relevant louvres 5 are directed with a view to avoid interfering with the free gas flow to the atmosphere while interfering with any gas flow in the reverse direction, that is toward the engine. On the other hand, in the other portion of the device the louvres 7 of orifices 8 face the opposed direction so as to subtract one portion of the gaseous stream from the central tube and force it toward the annular passage 12 formed externally of the central tube 4. On the other hand, this central tube 4 is closed at one point by a transverse wall 13 with or without perforations, thereby compelling the gases to flow into the annular passage 12, the amount of gas entering this annular passage 12 being inversely proportional to the total area of the holes in plate 13, if any. This annular passage 12 is sound-isolated by a lining of adequate sound-damping material 14, such as glass wool or the like, retained by a perforated sheet metal element 15 or the like.

In the last portion of the device the annular passage 12 communicates with the inner space of the central tube 4 beyond the transverse closing wall 13 through other perforations 10 formed with stamped or cut louvres 9 directed in the same way as the louvres 7, that is, with a view to providing a nondirect path for the gases flowing from the peripheral annular passage 12 to the central tube 4 as the gaseous stream flows to the outlet end of the device. The passage 12 is formed with a resonance conduit extension 16 terminating within a resonance chamber 17.

This muffler operates as follows. The exhaust gases travel at a very high speed at the beginning of the exhaust pulse and flow through the first portion of the device without entering chambers 11; moreover, as they flow past the sections throttled by the louvres 5 they develop a certain vacuum in these chambers 11. If the latter have variable volumes the time required for producing the maximum vacuum therein will also vary, and these chambers 11 will play somewhat the part of resonators tuned at different frequencies. The gases are prevented or substantially prevented from flowing back to the engine by the action exerted by the louvres 5.

After having passed through the first portion of the muffler the gases engage the louvres 8 and are compelled thereby to leave, at least partly, the central tube 4 and to enter the sound-isolated annular passage 12. The variation in velocity of these gases will impart a longitudinal vibratory motion thereto and compel one portion thereof to penetrate into the resonance chamber 17 in which they are reflected and caused to flow back through the last orifices 9 to the last portion of the central tube 4 forming an expansion chamber communicating directly with the outlet 3 and therefore with the outer atmosphere.

In the device illustrated in Figures 12 and 13 the outer case is designated by the numeral 21 and contains from the inlet end a series of funnel-shaped members 22 having their open centres nearer to the outlet end of the device, so as to interfere with the flow of exhaust gases in the opposed direction, i. e. toward the engine.

These funnel-shaped members are followed by an inner cylinder 23 divided by a partition 24 into two compartments 25, 26 and surrounded by a helical passage 27 comprising a head portion of progressively increasing cross-sectional area and a tail portion of progressively decreasing cross-sectional area. The first compartment 25 communicates through holes 28 with the head portion of the helical passage 27, and the other compartment 26 communicates through two or more tubes 29 inclined tangentially to the surface of this central tube 23 with the tail portion of progressively decreasing cross-sectional area of the helical passage, so that the gases will hardly engage these tangential tubes in their travel from the engine to the outlet end of the muffler but will easily penetrate them in the reverse direction, i. e. after having been reflected within the resonance chamber 31 provided at the rear end of the device; finally, the outlet pipe of the device is indicated at 30.

The device consisting of the cylinder 23 and helical conduit 27, although extremely efficient as far as noise suppression is concerned, would somewhat retard the exhaust gases and reduce the engine power if it were placed directly at the engine exhaust or at the outlet of an ordinary exhaust pipe, but the set of funnel-shaped members 22 dividing the cylindrical chamber of the first portion of the device into a plurality of compartments enables the exhaust gases to flow freely to the outside. The inclination of the walls of these funnel-shaped members 22 is calculated to produce in the aforesaid compartments a partial vacuum due to the passage of a gaseous stream through the central portion of the device. This vacuum is extremely useful since one portion of the uncompletely expanded gases in the second portion of the apparatus will flow back and be absorbed by this vacuum before returning to the exhaust tube.

The consequences are such that the gases undergo a relatively substantial retarding effect at the outlet of the muffler without however interfering with the power output because the back pressure is absorbed almost completely in the first portion of the device, as the inverted funnels 22 prevent the residual portion of the exhaust gases from flowing back to the engine.

It will be readily understood by anybody conversant with the art that many modifications and alterations may be brought to the forms of embodiment shown and described hereinabove, without departing however from the spirit and scope of the invention. Thus, more particularly, the arrangement provided in the first portion of the muffler may be combined with any other complemental system intended to increase the noise suppression.

What I claim is:

An exhaust muffler for internal combustion engines, comprising a tube connected at one end with the engine exhaust port and opening at its opposed end into a substantially rectangular-sectioned chamber consisting of two larger perforated walls and two smaller non-perforated walls, an intermediate wall parallel to said larger perforated walls which divides said chamber in the longitudinal direction into two substantially equal chambers, said intermediate wall having formed therein two sets of pressed louvres having their apertures directed toward the engine side of the chamber along the first half of the chamber and toward the outlet side along the second half of the chamber, said louvres projecting alternately from one and the other side of the intermediate wall, a pair of nonperforated plates parallel to the former and constituting with said larger perforated plates two chambers stuffed with sound-attenuating material, and a cylindrical case surrounding said chambers completely so as to form an additional pair of outer chambers positioned outside said pair of non-perforated plates, an outlet tube extending from the rear end of said rectangular-sectioned chamber, tapered portions connecting the front and rear ends of said cylindrical case with said first-mentioned tube and said outlet tube respectively, the arrangement being such that the stream of exhaust gases from the engine flow through said first and second halves of said rectangular-sectioned chamber by passing alternately from one to the other side of said intermediate wall, an additional and complemental sound-attenuating effect being obtained through said stuffed chambers and said additional pair of outer chambers.

References Cited in the file of this patent

UNITED STATES PATENTS

| | | |
|---|---|---|
| 1,169,030 | Hardy | Jan. 18, 1916 |
| 1,947,987 | Hathorn | Feb. 20, 1934 |
| 2,501,767 | Fluor et al. | Mar. 28, 1950 |
| 2,529,136 | Carlson | Nov. 7, 1950 |

FOREIGN PATENTS

| | | |
|---|---|---|
| 500,509 | France | Dec. 22, 1919 |
| 49,569 | France | May 11, 1939 |